Patented July 6, 1954

2,683,143

UNITED STATES PATENT OFFICE 2,683,143

PROCESS FOR THE PRODUCTION OF LOWER ALIPHATIC ACID ESTERS OF CELLULOSE CONTAINING A MORPHOLINE SUBSTITUENT

Blanche B. White, Summit, and Elisabeth Barabash, New Providence, N. J., assignors to Celanese Corporation of America, New York, N. Y., a corporation of Delaware No Drawing. Application August 2, 1951, Serial No. 240,068

5 Claims. (Cl. 260—213)

This invention relates to the production of cellulose derivatives and relates more particularly to an improved process for the production of cellulose derivatives containing a morpholine group as a substituent.

In Seymour et al., application Serial No. 66,824, filed December 22, 1948, now Patent No. 2,579,873, December 25, 1951, there are disclosed certain novel cellulose derivatives containing a morpholine group as a substituent. According to this application, the morpholine group is substituted on the cellulose molecule by reacting a cellulosic material containing free hydroxyl groups with an organic sulfonyl chloride, such as tosyl chloride or mesyl chloride, to produce an organic sulfonyloxy derivative of cellulose. Thereafter, the organic sulfonyloxy derivative of cellulose is reacted with morpholine, for example, by dissolving the said cellulose derivative in morpholine and heating the resultant solution to a temperature of between about 50 and 100° C. for a period of between about 1 and 3 hours. The relatively large number of steps involved in carrying out the process disclosed in this prior application plus the expense of the chemicals employed therein greatly increases the cost of the final product.

It is an important object of this invention to provide a novel process for the production of cellulose derivatives containing a morpholine group as a substituent which will be free from the foregoing and other difficulties and which will be especially simple and inexpensive.

A further object of this invention is to provide a novel process for the production of cellulose derivatives containing a morpholine group as a substituent by reacting a cellulosic material containing an acid sulfate group as a substituent with morpholine.

Other objects of this invention will be apparent from the following detailed description and claims.

According to the present invention, a cellulosic material containing acid sulfate groups as a substituent as, for example, a mixed ester of cellulose containing acid sulfate and organic acid ester groups, such as cellulose acetate acid sulfate, cellulose propionate acid sulfate, cellulose butyrate acid sulfate, cellulose acetate propionate acid sulfate, cellulose acetate butyrate acid sulfate, cellulose benzoate acid sulfate and cellulose glycollate acid sulfate, or an otherwise unsubstituted cellulosic material containing acid sulfate groups as a substituent is dissolved in a suitable solvent such as morpholine, pyridine, picoline or quinoline. When a material other than morpholine is employed as a solvent, morpholine is added to the solution and the morpholine is caused to react with the cellulosic material, for example, by heating the solution to a temperature of between about 50 and 100° C. for a period of between about 1 and 6 hours. Advantageously, in carrying out this reaction, there are employed from about 2 to 7 moles of morpholine for each mole of acid sulfate that is present in the cellulosic material. After the reaction is complete, the cellulose derivative may be recovered from solution by the addition thereto of a precipitant in which the cellulose derivative is insoluble, following which the cellulose derivative may be washed and dried.

During the reaction, it appears that at least the major portion of the acid sulfate groups are replaced by morpholine to produce a product in which the morpholine group is linked directly to the cellulose molecule through its nitrogen atom. However, at least a portion of the morpholine may react with the cellulosic material containing acid sulfate groups to produce a quaternary morpholinium salt. The acid sulfate groups that are displaced from the cellulosic material react with the excess morpholine and/or the solvent, if the latter is basic.

The cellulosic material containing the acid sulfate groups as substituents may be prepared in suspension in a manner well known in the art. For example, the mixed esters of cellulose containing acid sulfate groups and organic acid ester groups may be prepared by the esterification of a cellulosic material with an esterification mixture containing sulfuric acid, the anhydride of the organic acid it is desired to introduce into the cellulose molecule and benzene as a suspending medium. For best results, the esterification is carried out under anhydrous conditions to avoid hydrolysis and splitting off of the acid sulfate groups. The mixed ester prepared in this manner may advantageously contain from about 0.15 to 0.60 acid sulfate groups per glucose unit in the cellulose molecular and will yield a morpholine derivative having a nitrogen content of between about 0.5 and 2.5% by weight. The process of the present invention is particularly advantageous for the production of products having a nitrogen content of more than about 1.5% by weight in that the reaction proceeds more smoothly and more rapidly at these high nitrogen contents than the reaction in the process disclosed in the Seymour et al. application referred to above.

The following example is given to illustrate this invention further.

Example

A mixed ester of cellulose containing 2.42 acetyl groups and 0.58 acid sulfate groups per glucose unit was prepared from 100 parts of cotton linters in benzene suspension and the said ester was freed of glacial acetic acid and any sulfuric acid by repeated washing with anhydrous benzene. To the benzene wet ester there is added 1,000 parts of a 20% by weight solution of morpholine in pyridine. The reaction mixture is then heated for 4 hours to a temperature of 60 to 70° C. producing a clear, amber colored dope. To this dope there are added 4,000 parts by weight of ethanol and the cellulose derivative is precipitated from the resultant solution by the addition thereto of 4,000 parts by weight of ethyl ether. The precipitate obtained in this manner is washed with a mixture of equal parts by volume of ethanol and ethyl ether, and is finally dried.

The cellulose derivative has a sulfur content of 2.0% by weight, a nitrogen content of 2.2% by weight and an acetyl value of 52.2% calculated as acetic acid, indicating that there are approximately 2.42 acetyl groups, 0.48 morpholine groups and 0.10 acid sulfate groups per glucose unit in the cellulose molecule.

It is to be understood that the foregoing detailed description is given merely by way of illustration and that many variations may be made therein without departing from the spirit of our invention.

Having described our invention, what we desire to secure by Letters Patent is:

1. Process for producing lower aliphatic acid esters of cellulose containing a morpholine group as a substituent which comprises heating a lower aliphatic acid ester of cellulose containing an acid sulfate group as a substituent with morpholine until the morpholine group is substituted on the cellulosic molecule.

2. Process for producing lower aliphatic acid esters of cellulose containing a morpholine group as a substituent which comprises heating a lower aliphatic acid ester of cellulose containing from about 0.15 to 0.60 acid sulfate groups per glucose unit as a substituent with morpholine until the morpholine group is substituted on the cellulosic molecule.

3. Process for producing lower aliphatic acid esters of cellulose containing a morpholine group as a substituent which comprises heating a lower aliphatic acid ester of cellulose containing an acid sulfate group as a substituent with morpholine at a temperature of about 50 to 100° C. for a period of about 1 to 6 hours.

4. Process for producing cellulose acetate containing a morpholine group as a substituent which comprises heating a cellulose acetate containing an acid sulfate group as a substituent with morpholine until the morpholine group is substituted on the cellulosic molecule.

5. Process for producing cellulose acetate containing a morpholine group as a substituent which comprises heating a pyridine solution of a cellulose acetate containing from about 0.15 to 0.60 acid sulfate groups per glucose unit as a substituent with morpholine at a temperature of about 50 to 100° C. for a period of about 1 to 6 hours.

References Cited in the file of this patent

UNITED STATES PATENTS

| Number | Name | Date |
| --- | --- | --- |
| 2,292,332 | D'Alelio | Aug. 4, 1942 |
| 2,579,873 | Seymour et al. | Dec. 25, 1951 |

FOREIGN PATENTS

| Number | Country | Date |
| --- | --- | --- |
| 507,722 | Great Britain | June 20, 1939 |